J. Dawson,
Harrow.
No. 108,690.     Patented Oct. 25, 1870.
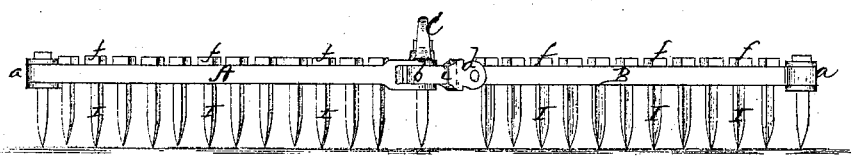
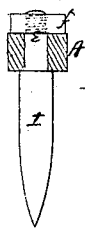
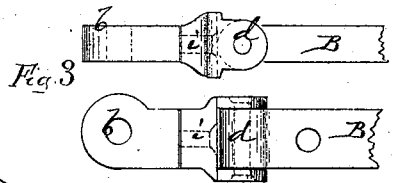
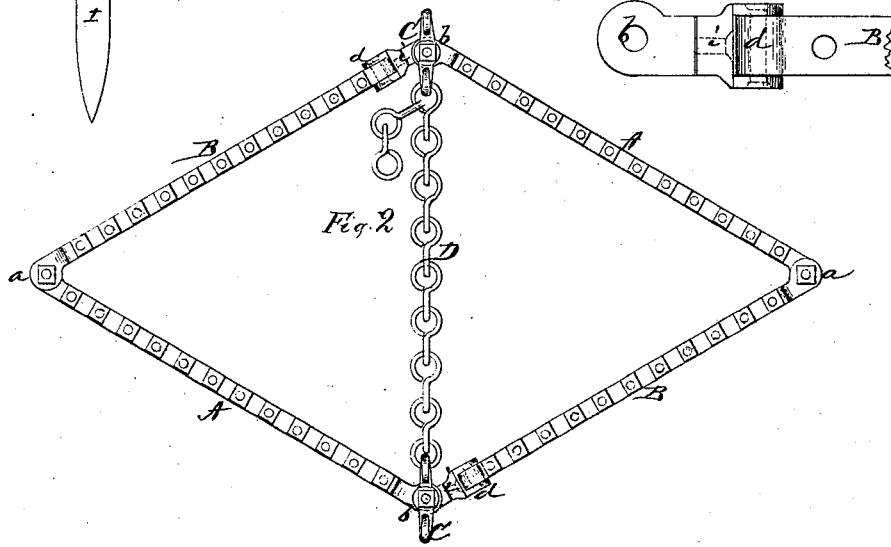
Witnesses:
Chas. Jacobs
J. V. White
Inventor:
James Dawson
Per
T. H. Alexander
Atty.

United States Patent Office.

JAMES DAWSON, OF GREENWOOD, ILLINOIS.

Letters Patent No. 108,690, dated October 25, 1870.

IMPROVEMENT IN HARROWS.

The Schedule referred to in these Letters Patent and making part of the same.

*To all whom it may concern:*

Be it known that I, JAMES DAWSON, of Greenwood, county of McHenry and State of Illinois, have invented certain new and useful Improvements in Harrows; and I do hereby declare the following is a full, clear, and exact description thereof, reference being had to the accompanying drawing, and to the letters of reference marked thereon, which form a part of this specification.

The nature of my invention consists in the construction and arrangement of a "harrow," as will be hereinafter fully set forth.

In order to enable others skilled in the art to which my invention appertains to make and use the same, I will now proceed to describe its construction and operation, referring to the annexed drawing, in which—

Figure 1 is a front view; and
Figure 2, a plan view of my harrow;
Figure 3 shows enlarged view of the joints or hinges of the harrow; and
Figure 4 shows the mode of fastening the teeth.

My harrow is composed of four bars, A B and A B, of inch-square iron, or other suitable material, hinged or jointed together, each set, A B, of the bars forming one side of the harrow.

The bars A and B are hinged or jointed together at $a$, as shown, and then the two halves of the harrow are hinged or jointed together in a similar manner at $b\ b$, said joints $a\ a$ and $b\ b$ being in the same plane as the bars themselves. The four bars thus form a four-sided figure which can be made square or otherwise, as may be desired.

The bars B B have further, near the joints $b\ b$, each another joint, $d$, at right right angles with the bars, so that either side of the harrow can be lifted up with ease.

In between the joints $b$ and $d$ is formed a swivel, $i$, as shown, so that either side of the harrow may turn when meeting any obstructions.

By means of the joints $a\ b\ d$ and swivels $i$, it will be seen that the harrow will accommodate itself to all irregularities of the ground over which it is passing.

Upon each of the joints $b$ is secured a double hook, C; one end of each of these hooks is connected by means of a chain, D, and the harrow is drawn by the team attached to the other end of either of said hooks.

It will readily be seen that by shortening the chain D the frame will spread sidewise and thus the harrow cut wide, but by lengthening the chain the frame will contract and the harrow cut narrow.

The teeth I are provided with screw-shanks, $e$, which pass upward through the bars, and are fastened by nuts, $f$.

When the teeth get dull on one side the team may be attached to the other end.

Having thus fully described my invention,

What I claim as new, and desire to secure by Letters Patent, is—

The coupling, consisting of the hinges $b\ d$, and swivel $i$, the swivels being arranged on opposite sides of the harrow-sections, as and for the purposes herein set forth.

In testimony that I claim the foregoing as my own, I affix my signature in the presence of two witnesses.

JAMES DAWSON.

Witnesses:
  JOHN WILSON,
  WILLIAM WILSON.